United States Patent

[11] 3,634,089

| [72] | Inventor | Fredrick Lynn Hamb<br>Rochester, N.Y. |
|---|---|---|
| [21] | Appl. No. | 813,705 |
| [22] | Filed | Apr. 4, 1969 |
| [45] | Patented | Jan. 11, 1972 |
| [73] | Assignee | Eastman Kodak Company<br>Rochester, N.Y. |

[54] FILM-FORMING POLYESTER COMPOSITIONS
14 Claims, No Drawings

| [52] | U.S. Cl. | 96/87 |
|---|---|---|
| [51] | Int. Cl. | G03c 1/78 |
| [50] | Field of Search | 96/87, 87 A |

[56] References Cited
UNITED STATES PATENTS

| 3,317,466 | 5/1967 | Caldwell et al. | 260/47 X |
|---|---|---|---|
| 3,178,378 | 4/1965 | Winchell | 96/87 |

*Primary Examiner*—Norman G. Torchin
*Assistant Examiner*—Edward C. Kimlin
*Attorneys*—W. H. J. Kline, B. D. Wiese and G. E. Battist ABSTRACT: A photographic element comprising a film support consisting of a polyester of a 1,1,3-trialkyl-5-carboxy-3-(p-carboxyphenyl) bisphenols, with specific bisphenols, said polyester having an average molecular weight of at least 30,000.

FILM-FORMING POLYESTER COMPOSITIONS

This invention relates to new film-forming, polymeric, polyester compositions. In one aspect, this invention relates to film-forming, polyester materials of a 1,1,3-trialkyl-5-carboxy-3-(p-carboxyphenyl)indan with specific bisphenols wherein said polymer has a weight average molecular weight of at least 30,000 and a glass transition temperature (Tg) of at least 200° C. In another aspect, this invention relates to new film-forming, polymeric, polyester compositions which have very desirable high heat distortion temperatures and good optical clarity. In another aspect, this invention relates to photographic elements comprising an improved support material.

It is known in the art to prepare foam depressants and the like with derivatives of a 5-carboxy-3-(carboxyphenyl)indan. Moreover, it is known that linear polymeric compounds can be made comprising units of a 5-carboxy-3-(carboxyphenyl)indan. However, it is desirable to provide low-cost, film-forming materials which can be used as photographic film supports which have improved physical characteristics. Presently, any film-forming materials which maintain good physical characteristics at high temperature (>200° C.) are commercially unattractive due to the cost of the component ingredients or the manufacturing conditions.

It is generally known that dicarboxylic acids can be polymerized with diols through a condensation reaction to make linear polyester compositions and that related polymers can also be made through transesterification reactions. The diols utilized to form the polyesters have generally been alkylene diols, such as alkylene glycols, or cycloalkylenediols. Diols such as bisphenols with an aliphatic central moiety have been used with aromatic dicarboxylic acids such as terephthalic acid to make linear polyesters; however, the polyester materials have generally not found commercial acceptance because of poor physical properties such as poor clarity, brittleness and low softening temperatures or glass transition temperatures as shown in *Ind. & Eng. Chem.*, 51, 147 (1959) and *Journal of Polymer Science*, Vol. XXVIII, pages 179-184 (1958).

I have now found that bisphenols having an aliphatic or monocyclic group in the central moiety can be copolymerized with 5-carboxy-3-(carboxyphenyl)indans to provide an economically attractive film-forming polymer which has improved physical properties. This support can be produced at a very low cost as the specified reactants are available at a low-cost unit basis and the reaction conditions are simple. In one aspect, linear polyester films made according to this invention can be solvent cast, subbed with conventional polyester subbing materials and coated with photographic compositions to produce photographic elements which can be processed at temperatures in excess of 200° C. and preferably above at least 240° C. According to certain preferred embodiments of this invention, the photographic elements comprising the novel support can be processed at temperatures of around 240° C. with very little effect on dimensional stability of the element. While it is known that 5-carboxy-3-(carboxyphenyl)indans can be used to obtain somewhat improved temperature properties in compositions, it is quite unexpected that the specific 5-carboxy-3-(carboxyphenyl)indans can be polymerized (or copolymerized) with the specific bisphenols of this invention to achieve a film-forming material with highly improved physical properties such as, for example, very high glass transition temperatures.

Generally, the embodiments of this invention relate to a polyester film-forming material having a glass transition temperature above 200° C. and preferably above 240° C.

One preferred embodiment according to this invention relates to linear polyester materials comprising units derived from a 1,1,3-trialkyl-5-carboxy-3-(p-carboxyphenyl)indan and a bisphenol having aliphatic or monocyclic groups in the central moiety.

Another preferred embodiment relates to linear polyester materials consisting of units of dicarboxylic acids esterified with a bisphenol having aliphatic or monocyclic groups in its moiety wherein said dicarboxylic acids comprise from about 50 to about 100 mole percent of 1,1,3-trialkyl-5-carboxy-3-(p-carboxyphenyl)indan and from about 0 to about 50 mole percent of a terephthalic acid.

Generally the polyesters of this invention are linear polyesters which comprise units of the following structure:

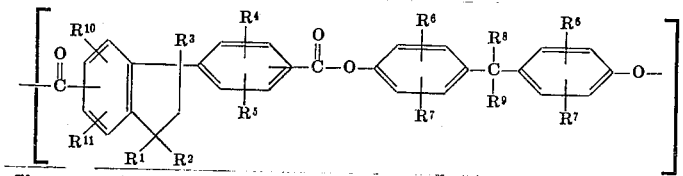

wherein $R^1$ and $R^3$ can each be hydrogen atoms or lower alkyl groups of one to six carbon atoms and preferably methyl groups; $R^2$ is an alkyl group of one to six carbon atoms and is preferably a methyl group; $R^4$, $R^5$, $R^6$, $R^7$, $R^{10}$ and $R^{11}$ can be hydrogen atoms, aryl groups such as phenyl including substituted phenyl, halogen atoms, nitro groups, cyano groups, alkoxy groups and the like wherein the substituents on the substituted phenyl are limited to the above groups; $R^8$ and $R^9$ represent aliphatic or monocyclic groups or bridged rings or fused rings and can each be hydrogen atoms, alkyl groups having one to six carbons atoms including substituted alkyl groups such as fluoromethyl, difluoromethyl, trifluoromethyl, dichlorofluoromethyl, 2-[2,3,4,5-tetrahydro-2,2-dimethyl-4-oxofur-3-yl]ethyl, and the like, cycloalkyl such as cyclohexyl, and aromatic radicals having six to 20 carbon atoms such as phenyl, 3,4-dichlorophenyl, 2,4-dichlorophenyl, or $R^8$ and $R^9$ can be taken together with the carbon atom to which they are attached to represent a bridged ring moiety or a fused ring moiety or a monocyclic moiety or a heterocyclic moiety having from four to seven atoms in the ring.

The bisphenols utilized to make the novel polyesters of this invention are generally of the structure:

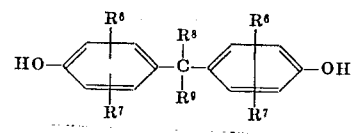

wherein $R^6$, $R^7$, $R^8$ and $R^9$ are as indicated above. The carbon atom together with $R^8$ and $R^9$ is referred to as the central moiety of the bisphenol for simplicity in defining the invention. Typical useful bisphenols include: Bisphenol A; 2,2-bis(4-hydroxy-3,5-dichlorophenyl)propane[tetrachlorobisphenol A]; 1-phenyl-1,1-bis(4-hydroxyphenyl)ethane; 1-(3,4-dichlorophenyl)-1,1-bis(4-hydroxyphenyl)ethane; 2,2-bis(4-hydroxyphenyl)-4-[3-(2,3,4,5-tetrahydro-2,2-dimethyl-4-oxofuryl)]butane; bis(4-hydroxyphenyl)methane; 2,4-dichlorobenzylbis(4-hydroxyphenyl)methane; 1,1-bis(4-hydroxyphenyl)cyclohexane; 1,1,1,3,3,3-hexafluoro-2,2-bis(4-hydroxyphenyl)propane; diphenylbis(4-hydroxyphenyl)methane.

Bisphenols of this type are economically attractive since they can generally be produced by the simple reaction mechanism as follows:

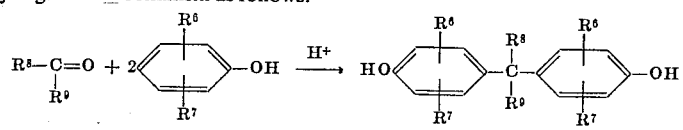

In contrast, bisphenols having bridged rings or fused rings in their central moieties are generally more difficult to make and can generally be made with only small yields.

The indandicarboxylic acid derivatives of this invention can be the sole acid unit in making the polymer, or other dicarboxylic acids which will not produce a deleterious effect on thermal properties of the polymer can be used in combination to make the polymer. Preferably aromatic mono- and poly-cyclic dicarboxylic acids such as phthalic acid, terephthalic acid, isophthalic acid, cyclohexadienedicarboxylic acid, naphthalenedicarboxylic acid, diphenic acid, binaphthyldicarboxylic acid, 4,4'-stilbenedicarboxylic acid, 4,4'-sulfonyldibenzoic acid, 9,10-triptycenedicarboxylic acid and the like are used in combination with the indandicarboxylic acids. Other suitable acids also include saturated cyclic dicarboxylic acids such as cyclohexanedicarboxylic acids, norbornanedicarboxylic acids and the like. Generally, cyclic dicarboxylic acids must be used to retain the desired physical properties of the support as opposed to aliphatic dicarboxylic acids which are generally unsuitable for the polymers of this invention, especially when they constitute more than about 10 percent of the total acid components. Preferably, the polyesters are substantially free of acid components derived from aliphatic dicarboxylic acids.

Generally, the polymerization of the reactants is continued to provide a polymer having a weight average molecular weight of at least 30,000 and preferably from 80,000 to 100,000. The molecular weight ($M_w$) can be determined by light scattering as generally disclosed by F. W. Peaker, "Light Scattering Techniques," published in *Techniques of Polymer Characterization*, edited by P. W. Allen, p. 131, Butterworth Scientific Publications, London (1959). The corresponding intrinsic viscosities measured in tetrahydrofuran can be determined from the relationship $Yint(THF) = 6.9 \times 10^{-4} M_w^{0.6}$. Generally, the useful film-forming polymers according to this invention have a Yint(THF) of about 0.3 to 1.4 and the preferred polymers for use in making photographic supports have a Yint(THF) of about 0.6 to about 0.8.

The glass transition temperatures as used in this invention and set forth in the specification, unless otherwise specified, can be calculated by differential thermal analysis as disclosed in "Techniques and Methods of Polymer Evaluation," Vol. 1, Marcel Dekker, Inc., N.Y., 1966.

The clarity of the material is compared to the clarity of water. Therefore, water white as used in this invention refers to a material which resembles water in appearance and clarity.

Film-forming as used in this invention refers to a material which will provide a self-supporting film of the material when cast or extruded, for example, when cast in sheets of from 1 to 7 mils thickness.

Generally, any esterification procedure known in the art for making linear polyesters is useful for making the compositions of the invention. Typical representative techniques are disclosed below:

a. The interfacial procedure can be utilized to make the polymers. One preferred embodiment with regard to the materials, solvents and catalysts is shown in example 2. The preferred time of reaction is a function of all other variables and, as such, is governed by the viscosity desired for the polymer. Generally, the reaction can be monitored by sampling and thus the preferred polymerization time chosen. For use of methylene chloride as the solvent, in certain embodiments the preferred temperature is 35° C. with the useful temperature range being from 10° to 40° C., such limits being governed on the one hand by maintaining a practical rate of reaction and on the other by the boiling point of the solvent. The use of other solvents is considered within the scope of this invention and would allow a broader range of temperature.

b. A solution procedure whereby the acid chloride and the bisphenol are placed in solution in the presence of an acid acceptor, usually pyridine, can be utilized to make the polymer. Pyridine can also be present in excess and thus serve also as the solvent. Example 3 illustrates this technique. Solvents other than pyridine can also be used such as methylene chloride, p-xylene, dimethylnaphthalene, 1-methylnaphthalene and diphenyl ether. The temperature can vary from around 20° C. to the boiling point of the solvent, limitation on an upper limit being governed by the tendency of the acid chloride to decompose thermally.

c. The ester interchange procedure of synthesizing polymeric esters both by the melt process and the powder process can advantageously be used to make the polyesters of this invention, particularly for those copolymers which can be crystallized. Example 7 is illustrative of this technique.

The film-forming materials of this invention can be generally extruded or cast into flexible supports, subbed with those subbing agents for polyester materials and used in various layer arrangements and structural combinations. In a preferred embodiment, a support of the polyester of this invention is used as the film support in photographic elements which are heat-processed or heat-stabilized. In particular, one preferred embodiment relates to photographic elements comprising the supports of this invention having at least one layer of a photographic emulsion which contains silver halide grains having polyvalent ions occluded therein as disclosed in Bacon et al. U.S. Ser. No. 625,590 filed Mar. 24, 1967, now U.S. Pat. No. 3,447,927, issued June 3, 1969. Elements of this type can be processed according to Colt, U.S. Pat. No. 3,418,122 issued Dec. 24, 1968.

The invention can be further illustrated by he following examples of preferred embodiments thereof, although it will be understood that the examples are included merely for purposes of illustration and are not intended to limit the scope of the invention unless otherwise indicated.

Example 1: Preparation of 1,1,3-trimethyl-5-chloroformyl-3-(p-chloroformylphenyl)indan A mixture of 324 g. (1.0 mole) of the diacid and 1,000 g. of thionyl chloride is placed in a 3-liter flask and refluxed for 24 hours. Excess thionyl chloride is removed by a water pump on a steam bath, leaving a thick amber oil. This oil is taken up in 300 ml. of warm benzene and 1,000 ml. of n-hexane is added. Cooling gives the acid chloride as hard white crystals. Recrystallization from 800 ml. of n-hexane gives 260 g. (0.72 mole, 72 percent) of m.p. 69°–75° C.

Anal. Calcd. for $C_{20}H_{18}Cl_2O_2$: C, 66.5; H, 5.0; Cl, 19.65
Found: C, 66.4; H, 5.3; Cl, 20.0

Example 2: Polymerization of 1,1,3-trimethyl-5-chloroformyl-3-(p-chloroformylphenyl)indan and 2,2-bis(p-hydroxyphenyl)propane. Interfacial process.

The bisphenol (5.7 g., 0.025 mole) is added to a solution of 2.0 g. (0.05 mole) of sodium hydroxide pellets in 150 ml. of distilled water and the mixture stirred until solution is complete. Three drops of tri-n-butylamine are added. While stirring rapidly in a blender, a solution of 9.025 g. (0.025 mole) of the acid chloride in 75 ml. of methylene chloride is added over a 1-minute period. This mixture is stirred for 45 minutes and poured into 1.5 liters of methanol. The resulting fibrous solids is filtered, washed with water, washed with methanol and air-dried. The product is taken up in methylene chloride and precipitated into methanol. Filtration and drying at 110° C. overnight gives 11 g. (84 percent) of polyester.

The polymer has an inherent viscosity of 0.98 when measured in chloroform (0.25 g./100 ml.) at 25° C. The glass transition temperature is 265° C. when a heating rate of 5° C./minute is employed. When heated on a melting-point apparatus, the fibrous polymer becomes slightly soft at 310°–320° C. and glassy at 370°–380° C., but does not become truly free-flowing below 400° C. Discoloration to an amber color occurs above 350° C.

Example 3: Polymerization of 1,1,3-trimethyl-5-chloroformyl-3-(p-chloroformylphenyl)indan and 2,2-bis(p-hydroxyphenyl)propane. Solution process.

The bisphenol (5.7 g., 0.025 mole) is added to 100 ml. of pyridine (distilled from barium oxide). After solution is complete, 9.025 g. (0.025 mole) of the solid acid chloride is added with stirring. The mixture is stirred and heated to 90° C. and maintained there for 2 hours. Then the solution is allowed to come to room temperature and stirring is continued for 3 days. The mixture is poured into 1 liter of water. The resulting solid is filtered, digested with water on a steam bath for 15 minutes and filtered. The product is washed with methanol and dried. Reprecipitation into methanol from methylene chloride gives a quantitative yield of the polymer with an inherent viscosity of 0.31 in chloroform (0.25 g./100 ml.)

Example 4

Other homopolymers are made according to the procedure of example 2. The general formula of the representative unit and properties are itemized in table I below.

TABLE I

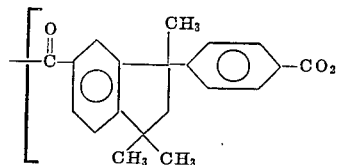

| $R_1$ | $R_2$ | $R_3$ | Inherent viscosity (CHCl$_3$) | Tg,° C. |
|---|---|---|---|---|
| —H | —CH$_3$ | —CH$_3$ | 0.98 | 265 |
| —H | —CH$_3$ | 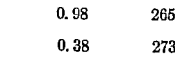 | 0.38 | 273 |
| —H | —CH$_3$ |  | 0.38 | 273 |
| —H | —H | —H | 0.65 | (¹) |
| —H | —H |  | 0.67 | 273 |
| —H | —H | 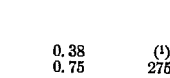 | Insoluble | (¹) |
| —H | —CF$_3$ | —CF$_3$ | 0.38 | (¹) |
| —Cl | —CH$_3$ | —CH$_3$ | 0.75 | 275 |
| —H | | 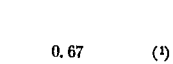 | 0.67 | (¹) |

¹ None observed.

Copolymers can be prepared having recurring units of different unit formulas within the above general structures.

Example 5

This composition is prepared just as that of example 2 using:
5.7 g. (0.025 mole) of Bisphenol A
100 ml. 0.5 N sodium hydroxide solution
50 ml. distilled water
3 drops of tri-n-butylamine
6.77 g. (0.01875 mole) 1,1,3-trimethyl-5-chloroformyl-3-(p-chloroformylphenyl)indan
1.27 g. (0.00625 mole) terephthaloyl chloride
75 ml. methylene chloride After 2 hours the mixture is worked up as in example 2 giving a polymer of inherent viscosity =1.01, and a Tg of 251° C.

Example 6

This composition is prepared just as that of example 2 using:
2.85 g. (0.0125 mole) Bisphenol A
4.58 g. (0.0125 mole) tetrachlorobisphenol A
100 ml. 0.5 N sodium hydroxide solution
50 ml. water
3 drops tri-n-butylamine
2.54 g. (0.0125 mole) isophthalyl chloride
4.52 g. (0.0125 mole) 1,1,3-trimethyl-5-chloroformyl-3-(p-chloroformylphenyl)indan
75 ml. methylene chloride After 2 hours the mixture is worked up as in example 2 giving a polymer of inherent viscosity =0.54, and Tg of 249° C.

Example 7: Easter interchange preparation

Part A: Preparation of prepolymer

The following reactants are placed in a 200 ml. one-neck round-bottom flask:
62.5 g. (0.2 mole) Bisphenol A diacetate
48.7 g. (0.15 mole) 1,1,3-trimethyl-5-carboxy-3-(p-carboxyphenyl)indan
8.3 g. (0.05 mole) terephthalic acid
0.02 g. di-n-butyl tin oxide The flask is fitted with a Vigreux-Claisen adapter through which is passed a glass tube for nitrogen flow. The flask is gradually lowered into a 300° C. salt bath while maintaining a nitrogen blanket. As the solids melt, the nitrogen tube is inserted into the melt. The melt gradually becomes clear and is kept at 320° C. for 75 minutes. At the end of this time, the nitrogen tube is removed and a paddle-wheel stirrer inserted. With stirring, the pressure is reduced to 2 mm. After 20 minutes, stirring is halted, the vacuum is released and the light amber prepolymer is isolated. The solid is ground to 20 mesh. It has an inherent viscosity of 0.17.

Part B: Solid phase buildup of prepolymer

Five grams of the solid prepolymer is placed in a test tube with a ground-glass joint. To this is attached a vacuum line and the pressure is reduced to less than 0.5 mm. The test tube is heated at 260° C. for 48 hours to give a slightly fused plug of inherent viscosity =0.61, and a Tg of 255° C.

Example 8: Preparation of polyester films and products

Part A: Preparation of polyester films by solvent casting

A solution is prepared from the following constituents:
8 g. polyester from example 2
50 ml. p-dioxane
10 ml. methylene chloride
1 ml. methanol
2 ml. iso-propanol
1 ml. t-butanol The solution is shaken overnight and filtered with suction through a fritted glass funnel. Coatings are made on Teflon-covered glass plates. After curing 6 hours at room temperature, plates are heated at 40° C. for one-half hour and then at 60°–70 C. for 3 days. Finally, heating at 150° C. for 3 hours gives a water-white sheet of 4 mils thickness.

Placing the sheet prepared above on a mandrel at 250° C. under tension gives no apparent distortion.

Part B: Preparation of photographic products from films of part A

Strips of the above polyester film (35 mm.) are treated with nitrogen dioxide by the process of example 1 of U.S. Pat. application Ser. No. 772,745 now abandoned, but see Belgian Pat. No. 736,993, issued Oct. 15, 1969. The treated samples are coated with a printout emulsion of Bacon et al. U.S. Ser. No. 625,590 filed Mar. 24, 1967 now U.S. Pat. No. 3,447,927, issued June 3, 1969. When the final product is heated for 5 seconds on a 235° C. mandrel, the films show no noticeable distortion and the adhesion of the photosensitive layer both before and after exposure and processing is good.

Similar results are obtained when each polyester material described in the previous examples are cast, treated, coated and heated as described by the above procedure.

Example 9: Polymerization of Bisphenol A and 1,1,3-trimethyl-5-chloroformyl-3-(p-chloroformylphenyl)indan In a 200-gallon glass-lined reactor having an automatic temperature control, a downward-deflecting baffle, a variable-speed, 3-bladed stirrer and a reflux condenser, are placed 618 lbs. of distilled water, 17 lbs. of 50 percent sodium hydroxide and 24.25 lbs. of Bisphenol A. The mixture is stirred about 16 hours, the stirring is stopped and 482.25 lbs. of methylene chloride are added. Stirring is continued at 90 r.p.m. and 56.8 ml. of tri-n-butylamine are added, followed by a solution of 38.25 lbs. of 1,1,3-trimethyl-5-chloroformyl-3-(p-chloroformylphenyl)indan in 154 lbs. of methylene chloride. The mixture is heated to, and maintained at, 35° C. After 2 hours an additional 26.4 ml. of tri-n-butylamine are added, and after another 2 hours 13.2 ml. more of tri-n-butylamine are added. When the viscosity of the reaction mixture has reached the desired maximum, typically about 8 hours. Four hundred and eighty milliliters of acetic acid are added to the reaction, and the reactor is filled with distilled water. The mixture is stirred an additional 15 minutes, then allowed to stand and separate for about 16 hours. The aqueous layer is removed and the organic layer is washed by filling the reactor with distilled water, stirring for 15 minutes, allowing to separate and removing the aqueous wash layer. Washing is continued in this manner until the aqueous layer is reasonably free of chloride, i.e., until a test on the wash water with silver nitrate solution produces less precipitate than an equivalent test on an equal volume of tap water. Usually, a total of four washes is sufficient.

After removal of the final wash, 50 gallons of methylene chloride are added to the reactor with stirring at 50 r.p.m. The mixture is stirred 15 minutes, then poured slowly into 300 gallons of rapidly stirred methanol contained in a 500-gallon precipitation tank. Stirring is continued for 30 minutes after all the dope has been added to the methanol. Part of the methanol (100 to 200 gallons) is siphoned out of the 500-gallon tank with a suction filter and is promptly replaced with 150 gallons of methanol. The mixture is stirred 1 hour and all the methanol is siphoned out. Fresh methanol (200 gallons) is poured over the precipitate and the mixture is allowed to stand for about 16 hours. The methanol is again siphoned out, the solid is collected by filtration and dried at 66° C. under reduced pressure (about 27 inches of mercury). The yield of polymer is 55 lbs. The inherent viscosity in chloroform is 0.69.

Example 10: Polymerization of Bisphenol A; 1,1,3-trimethyl-5-chloroformyl-3-(p-chloroformylphenyl)indan; and terephthaloyl chloride.

A: Interfacial Process

Bisphenol A (11.42 g., 0.05 mole) is added to 200 ml. of 0.5 N sodium hydroxide solution. Water (100 ml.) is added, the mixture is stirred until solution is complete, and then 6 drops of tri-n-butylamine are added. While stirring rapidly in a blender, a solution of 13.55 g. (0.0375 mole) of 1,1,3-trimethyl-5-chloroformyl-3-(p-chloroformylphenyl)indan and 2.54 g. (0.0125 mole) of terephthaloyl chloride in 225 ml. of methylene chloride is added over about a 1-minute period. The mixture is stirred for 1.5 hours and 3 drops more of tri-n-butylamine is added. After stirring another one-half hour, 75 ml. of methylene chloride is added and stirring is continued another 3 hours. The mixture is acidified with acetic acid and poured into 2.1 of methanol with stirring. The precipitated polymer is collected by filtration, washed with methanol and dried to yield a white, tough product having an inherent viscosity in chloroform of 0.73.

B. Repeat of the above Interfacial Process

The above process is repeated and yields a white, tough polymer having an inherent viscosity in chloroform of 0.69.

C: Ester Interchange Process

The following materials are placed in a 2-liter stainless steel pot fitted with a 3-neck, stainless steel top having a stirrer, nitrogen inlet and a condenser with a takeoff.

| | |
|---|---|
| 1,1,3-trimethyl-5-carboxy-3-(p-carboxy-phenyl)indan | 121.5 g. (0.375 mole) |
| terephthalic acid | 20.75 g. (0.125 mole) |
| Bisphenol A diacetate | 156 g. (0.5 mole) |
| dibutyltin oxide | 0.05 g. |

The mixture is heated under a nitrogen atmosphere at 320° C. for about 1.75–2 hours and then the pressure is slowly reduced to about 0.5 mm. Hg. Heating and stirring are continued for about 20 minutes longer. Upon cooling, a light tan, hard, tough polymer having an inherent viscosity in chloroform of 0.42 is obtained.

The polymer is ground to pass through a 1-mm. sieve and placed in a 1-liter, 2-neck flask. The flask is evacuated to a pressure of about 0.02 mm. Hg, heated at 260°–275° C. for 21.5 hours and cooled. The solid is taken up in 2 l. of methylene chloride, the solution filtered through glass wool, and the filtrate poured into methanol to precipitate a light tan fibrous solid. The solid is collected by filtration and dried in a vacuum oven at 90°–100° C. The polymer has an inherent viscosity in chloroform of 0.65.

D: Blend of the above three polymers

The polymers prepared in procedures A, B and C above are physically mixed in the proportions given below to provide a polymer blend.

| | |
|---|---|
| Polymer from procedure A | 25 g. |
| Polymer from procedure B | 25 g. |
| Polymer from procedure C | 130 g. |

Films of this polymer blend are cast from methylene chloride. The physical properties of the films are given in the table in example 11.

Example 11

The blended film of example 10 and the film of example 9 are tested for physical properties as follows:

| Physical Property | Example 9 | Example 10 |
|---|---|---|
| Thickness, mils | 3.3 | 3.9 |
| Tensile heat distortion temp., °C., 2% elongation | 263 | 260 |
| Yield strength, p.s.i. | 7,600 | 8,300 |
| Yield elongation, % | 6.7 | 4.8 |
| Break strength, p.s.i. | 7,700 | 9,100 |
| Break elongation, % | 42 | 8 |
| Young's Modulus, 10³ p.s.i. | 3.1 | 3.0 |
| Instron tear, grams | 30 | 32 |
| MIT folds | 55 | 210 |

Although the invention has been described in considerable detail with particular reference to certain preferred embodiments thereof, variations and modifications can be effected within the spirit and scope of the invention.

I claim:

1. A photographic element comprising (1) a support of a polyester material comprising units of the structure:

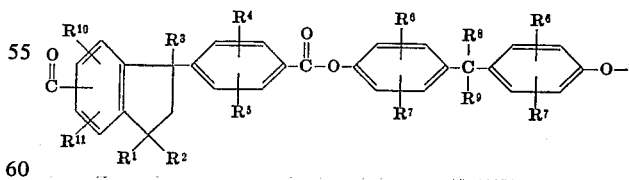

wherein $R^1$ and $R^3$ can each be hydrogen or lower alkyl of one to six carbon atoms, $R^2$ is an alkyl group of one to six carbon atoms, $R^4$, $R^5$, $R^6$, $R^7$, $R^{10}$ and $R^{11}$ can each be hydrogen, aryl, halogen, nitro, cyano, alkoxy, $R^8$ and $R^9$ represent aliphatic or monocyclic groups or bridged rings or fused rings or can be hydrogen atoms or alkyl group of one to six carbon atoms, or substituted alkyl, aryl, or cycloalkyl, or aromatic radicals having six to 20 carbons, or substituted aromatic radicals, or $R^8$ and $R^9$ taken together with the carbon atom to which they are attached can be a bridged ring moiety or a fused ring moiety or a monocyclic moiety or a heterocyclic moiety having from four to seven atoms in the ring, and (2) at least one layer of a silver halide emulsion.

2. A photographic element according to claim 1 wherein the said layer of silver halide emulsion comprises silver halide grains having polyvalent metal ions occluded therein.

3. The photographic element according to claim 1 wherein the dicarboxylic acid portion of said polyester is a 1,1,1-trialkyl-5-carboxy-3-(p-carboxyphenyl)indan.

4. The photographic element according to claim 1 wherein the bisphenol portion of said polyester is Bisphenol-A.

5. The photographic element according to claim 1 wherein said polyester material has a weight average molecular weight of at least 30,000.

6. The photographic element according to claim 1 wherein said polyester material has an intrinsic viscosity in tetrahydrofuran of 0.3 to 1.4.

7. The photographic element according to claim 1 wherein said polyester material has an intrinsic viscosity in tetrahydrofuran of 0.6 to 0.8.

8. The photographic element according to claim 1 wherein the polyester material is a linear polyester consisting essentially of units as specified in claim 1.

9. The photographic element according to claim 8 wherein said polyester material is copoly[2,2-bis(p-oxyphenyl)-propane-1,1,3-trimehtyl-5-carbonyl-3-(phenyl-p-carbonyl)indan].

10. The photographic element according to claim 1 wherein the polyester material comprises units as specified in claim 1 in copolymerized relationship with units of a dissimilar aromatic dicarboxylic acid with a diol.

11. The photographic element according to claim 10 wherein said aromatic dicarboxylic acid is a terephthalate acid.

12. The photographic element according to claim 11 wherein said diol is a bisphenol.

13. The photographic element according to claim 10 wherein said polyester material is poly[2,2-bis-(p-oxyphenyl)-propane-1,1,3-trimethyl-5-carbonyl-3-(phenyl-p-carbonyl)indan: terephthaloyl].

14. The photographic element according to claim 1 wherein the said polyester material has a glass transition temperature of at least 200° C.

* * * * *

UNITED STATES PATENT OFFICE
CERTIFICATE OF CORRECTION

Patent No. 3,634,089      Dated January 11, 1972

Inventor(s) Frederick L. Hamb

It is certified that error appears in the above-identified patent and that said Letters Patent are hereby corrected as shown below:

In the Abstract, line 3, "bisphenols" (first ocurrence), should read ---indan---. Column 3, line 35, "$6.9 \times 10^{-4} M_w^{0.6}$" should read ---$6.9 \times 10^{-4} M_w^{0.6}$---. Column 10, line 3, "trimehtyl", should read ---trimethyl---.

Signed and sealed this 8th day of August 1972.

(SEAL)
Attest:

EDWARD M. FLETCHER, JR.
Attesting Officer

ROBERT GOTTSCHALK
Commissioner of Patents